(12) United States Patent
Ranstad

(10) Patent No.: US 7,701,732 B2
(45) Date of Patent: Apr. 20, 2010

(54) POWER SUPPLY FOR ELECTROSTATIC PRECIPITATOR

(75) Inventor: Per Anders Gustav Ranstad, Växjö (SE)

(73) Assignee: Alstom Technology Ltd., Baden (CH)

( * ) Notice: Subject to any disclaimer, the term of this patent is extended or adjusted under 35 U.S.C. 154(b) by 31 days.

(21) Appl. No.: 12/333,715

(22) Filed: Dec. 12, 2008

(65) Prior Publication Data

US 2009/0129124 A1 May 21, 2009

Related U.S. Application Data

(63) Continuation of application No. PCT/EP2007/056128, filed on Jun. 20, 2007.

(30) Foreign Application Priority Data

Jun. 23, 2006 (EP) .................................. 06115983

(51) Int. Cl.
  *H02M 3/335* (2006.01)
  *H02M 7/5387* (2007.01)
(52) U.S. Cl. ........................................ 363/17; 363/132
(58) Field of Classification Search .................. 363/16, 363/17, 21.02, 34, 37, 97, 98, 131, 132; 323/355, 323/359, 362, 363
See application file for complete search history.

(56) References Cited

U.S. PATENT DOCUMENTS

| | | | |
|---|---|---|---|
| 5,023,768 A | 6/1991 | Collier | |
| 5,639,294 A * | 6/1997 | Ranstad | ............................ 95/6 |
| 5,835,367 A | 11/1998 | Pan et al. | |
| 6,735,094 B2 * | 5/2004 | Steigerwald et al. | .......... 363/17 |
| 2007/0047266 A1 * | 3/2007 | Nakahori | ...................... 363/17 |
| 2007/0103942 A1 * | 5/2007 | Hung et al. | ................... 363/17 |

FOREIGN PATENT DOCUMENTS

| | | |
|---|---|---|
| EP | 0260825 A2 | 3/1988 |
| GB | 928072 A | 6/1963 |
| WO | 8807413 A | 10/1988 |
| WO | 0016906 A1 | 3/2000 |

* cited by examiner

*Primary Examiner*—Matthew V Nguyen
(74) *Attorney, Agent, or Firm*—Volpe and Koenig, P.C.

(57) ABSTRACT

A high-voltage AC-DC converter is provided that converts alternating current into high-voltage direct current to be provided to a load, e.g. for use as an electrostatic precipitator. The converter includes at least one transformer, wherein the transformer includes at least one primary winding on the AC-side and at least two secondary windings on the DC-side. The converter further includes at least one rectifier rectifying alternating input current, comprising at least one transistor bridge converting the resulting direct current into alternating current, the transformer transforming the resulting alternating current, and comprising at least two high-voltage rectifiers connected to each of the secondary windings, wherein the output voltage of the high-voltage rectifiers is connected in series.

16 Claims, 6 Drawing Sheets

POWER SUPPLY FOR ELECTROSTATIC PRECIPITATOR

CROSS REFERENCE TO RELATED APPLICATIONS

This application is a continuation of International Application No. PCT/EP2007/056128 filed Jun. 20, 2007, which claims priority to European Patent Application No. 06115983.6 filed Jun. 23, 2006, the contents of both of which are incorporated by reference as if fully set forth.

FIELD OF INVENTION

The present invention relates to power supplies for high-voltage DC-applications, such as for electrostatic precipitators.

BACKGROUND

In many contexts, especially in flue gas cleaning, electrostatic precipitators (ESP) are highly suitable dust collectors. Their design is robust and they are very reliable. Moreover, they are most efficient. Degrees of separation above 99.9% are not unusual. Since, when compared with fabric filters, their operating costs are low and the risk of damage and stoppage owing to functional disorders is considerably smaller, they are a natural choice in many cases. In an electrostatic precipitator, the polluted gas is conducted between electrodes connected to a high-voltage rectifier. Usually, this is a high-voltage transformer with thyristor control on the primary side and a rectifier bridge on the secondary side.

This arrangement is connected to the ordinary AC mains and thus is supplied at a frequency, which is 50 or 60 Hz.

The power control is affected by varying the firing angles of the thyristors. The smaller the firing angle, i.e. the longer conducting period, the more current supplied to the precipitator and the higher the voltage between the electrodes of the precipitator.

Modern power supplies for these ESP are so-called series loaded resonant converters (SLR), which allow to have high-power (typically in the range of 10-200 kW) and high-voltage (50-150 kV DC) while at the same time keeping switching losses at a minimum. The focus of the R&D is higher output power.

The used topology is a series loaded resonant converter, SLR, e.g. as given in FIG. 1. The three phase main with the three phases 1-3 which can be individually switched by switches 4, is rectified by a six-pulse rectifier 6 e.g. comprising diodes 5. This rectifier may however also be an actively switched rectifier. The rectified voltage is smoothed by a DC-link capacitor 13 in the DC-link 6. The DC link voltage is fed to a transistor bridge 8 (H-bridge), comprising four transistors 14, 14', 15, 15'. The output of the bridge 8 (high frequency AC voltage) is connected, via a resonant tank 9, to the primary of a transformer 10. The resonant tank 9 comprises an inductor 16 and a capacitor 17 in series and together with the primary winding 18 these elements basically define the resonance frequency of the resonant tank, which correspondingly can only reasonably be operated around this resonance frequency. The transformer 10, consisting of the primary winding 18 and the secondary winding 19, adapts the input voltage (mains) to the load 12 (ESP, 50-150 kV). The secondary alternating voltage of the transformer 10 is rectified by a high voltage rectifier 11 and fed to the load 12. The output voltage is normally negative.

In order to increase the power handling capability and to establish a scaleable design, modularizing is used. The fundamental issue when modularizing is to control the load sharing i.e., to secure that different modules take equal or well defined shares of the load.

The high voltage transformer 10 is a key component in the system. Due to the high frequency operation the transformer 10 can be made small. Thus, compared to low frequency designs, the power density is high, leading to high electric fields and to the demand of a high efficiency.

Normally, a transformer for an ESP power supply is immersed in oil to get the appropriate electrical insulation. Also solid insulation materials are in use, in order to strengthen the system where needed.

The presences of high voltage, high frequency AC-fields gives raise to partial discharges (PD) in the insulation system, which will by time deteriorate the system.

The high operation puts focus on the parasitic components of the transformer, these are: leakage inductor, winding capacitor, and magnetizing inductor. The first affect the operation the most. The leakage inductor is connected in series with the resonance tank inductor and has to be considered in the design, as a circuit element. Hence, it has to be controlled and defined by the design.

SUMMARY

The present disclosure is directed to a high-voltage AC-DC converter that converts alternating current into high-voltage direct current to be provided to a load. The converter includes at least one transformer. The at least one transformer comprises at least one primary winding on an AC-side and at least two secondary windings on a DC-side. The converter further includes at least one rectifier that rectifies alternating input current, which includes at least one transistor bridge that converts the resulting direct current into alternating current. The at least one transformer transforms the resulting alternating current, and includes at least two high-voltage rectifiers connected to each of the secondary windings. The output voltage of the at least two high-voltage rectifiers is connected in series.

The present disclosure is also directed to an electrostatic precipitator that includes a high-voltage AC-DC converter that converts alternating current into high-voltage direct current to be provided to a load. The converter includes at least one transformer. The at least one transformer comprises at least one primary winding on an AC-side and at least two secondary windings on a DC-side. The converter further includes at least one rectifier that rectifies alternating input current, which includes at least one transistor bridge that converts the resulting direct current into alternating current. The at least one transformer transforms the resulting alternating current, and includes at least two high-voltage rectifiers connected to each of the secondary windings. The output voltage of the at least two high-voltage rectifiers is connected in series.

BRIEF DESCRIPTION OF THE DRAWINGS

In the accompanying drawings preferred embodiments of the invention are shown in which.

DETAILED DESCRIPTION OF THE PREFERRED EMBODIMENTS

Introduction to the Embodiments

Figure 1:
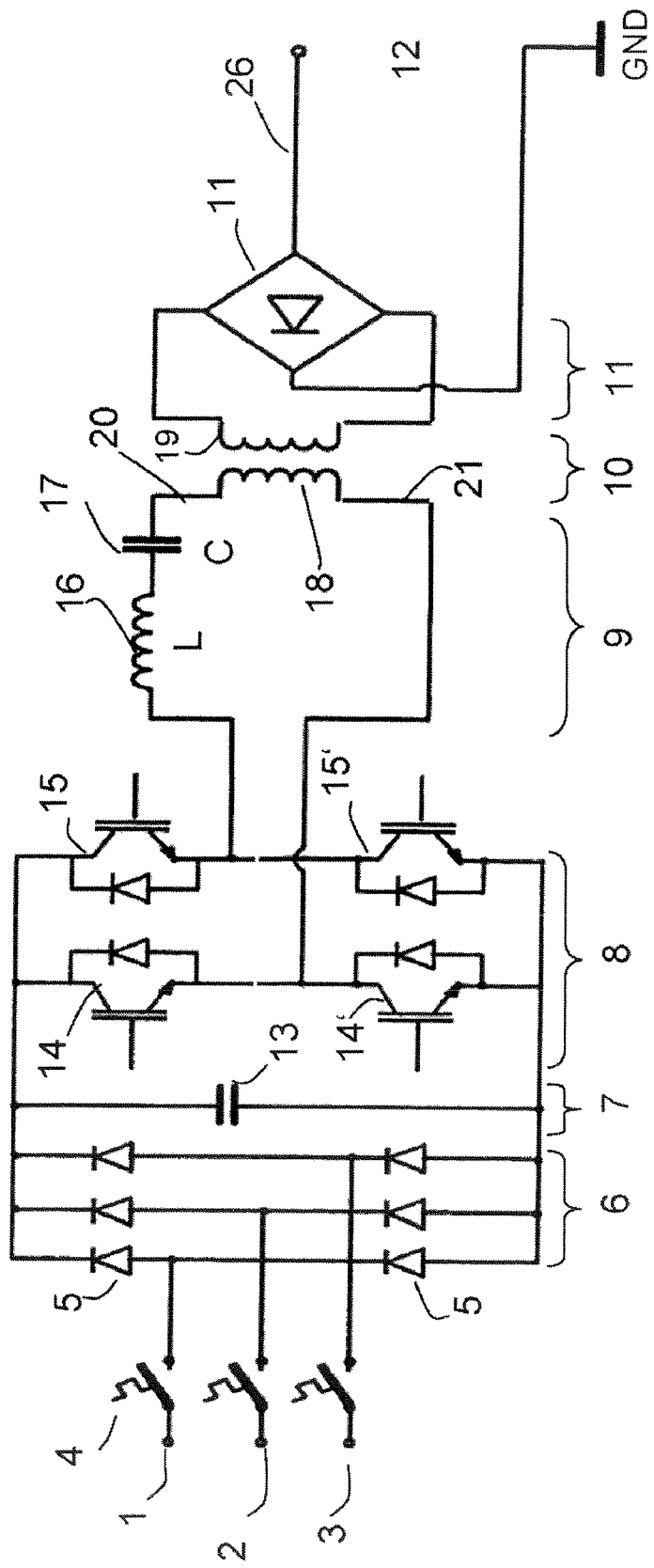
FIG. 1 shows a schematic circuitry of a series loaded resonant converter according to the state-of-the-art.

One of the objectives underlying the present invention is therefore to provide an improved high-voltage AC-DC converter that converts alternating current into high-voltage direct current to be provided to a load.

The present invention improves such systems preferably by providing a converter comprising at least one transformer, wherein specifically the transformer comprises at least one primary winding on the AC-side and at least two secondary windings on the DC-side.

One of the key features of the invention is therefore the fact that by providing more than one secondary winding on the DC side of the transformer the transformer becomes more fault-tolerant since if one winding on the secondary side is shorted, this does not necessarily lead to a failure of the full system. Furthermore, it is possible to make sure that there is no magnetic coupling between secondary windings. In addition, a modular system is provided, which allows scaling up or scaling down by addition or removal of individual secondary windings.

Furthermore, the provision of several individual secondary windings allows having a cross-section of the magnetic core as wide as possible while keeping the length of the magnetic path in the magnetic core as short as possible. So the efficiency of the transformer is increased, and one needs less material for the magnetic cores, which leads to a higher cost efficiency.

According to an embodiment of the converter, it is of the type comprising at least one rectifier rectifying alternating input current (the rectifier can be of the passive types such as a diode bridge, it can also be an actively switched type with actively controlled transformers), comprising at least one transistor bridge converting the resulting direct current into alternating current. Said transformer transforms the resulting alternating current, i.e. the output of the transistor bridge and it comprises at least two high-voltage rectifiers connected to each of the secondary windings, wherein the output voltage of the high-voltage rectifiers is connected in series. Again this increases modularity of the system, since each secondary winding, each comprising an individual associated magnetic core, has its own high-voltage rectifier. Furthermore, control is simplified due to this modular system.

This aspect of the invention, having one rectifier connected to each secondary winding has the particular advantage in high voltage applications in a mid- to high-frequency range, for example, 20-40 kHz. This solution allows the handling of the power conversion with reduced stresses on the components and materials. The designs of the state of the art, when applied to high voltage power conversion would result in comparatively bulky designs.

According to a further preferred embodiment, three phase input alternating current (e.g. from the mains, 50 or 60 Hz) is rectified in the rectifier, the resulting direct current is input to the transistor bridge via a DC link with two conductors comprising a filter element, said filter element preferably given by at least one capacitor (also a higher order filter is possible) between the two conductors, and the transistor bridge preferably is structured as an H-bridge with at least four switchable transistors or a multiple of four switchable transistors.

Preferably, between the transistor bridge and the transformer there is located a resonant tank, preferably comprising at least one series resonator with at least one inductor and at least one capacitor. So preferably, the converter is of the type called series loaded resonant converter (SLR).

In a further embodiment of the present invention, correspondingly the transformer comprises at least two magnetic cores, wherein each secondary winding is associated with an individual magnetic core. In principle it would be possible to have one magnetic core for several secondary windings. It is however preferred to have a magnetic core for each secondary winding. This leads to a different behaviour, as such a transformer actually behaves like individual primary and individual secondary windings. So the provision of one magnetic core for each secondary winding makes the system truly modular and the current is always identical.

As already mentioned above, it is generally preferred that each secondary winding is connected to an individual high-voltage rectifier, and all high-voltage rectifiers are connected in series to add to the total DC voltage.

The transformer may have two secondary windings; it is however preferred to have at least 4, preferably at least 8, and even more preferably at least 16 secondary windings. Again in order to have a true modularity, it is preferred that in each case each secondary winding has its own individual magnetic core. Preferably each of these secondary windings is connected to an individual high-voltage rectifier as discussed above.

Also on the primary side it is possible to have several windings, so according to a further preferred embodiment, the transformer comprises at least two primary windings.

From a construction point of view it is furthermore preferred, if there is at least four secondary windings which are provided around closed magnetic cores, through the opening of which magnetic cores the primary winding is located or wound.

In such a system, the primary winding can be provided as a loop comprising at least two turns, and two groups of at least two secondary windings and the associated closed magnetic cores can be arranged as coaxial stacks in two substantially parallel legs of the transformer.

A further structure is given in that the primary winding is provided as two loops each comprising at least two turns, wherein there is at least 8, preferably 16 secondary windings (each with an associated closed magnetic core), and wherein four groups of each at least two, preferably at least four secondary windings and the associated individual closed magnetic cores are arranged in coaxial stacks of four substantially parallel oriented legs of the transformer.

Of course each of the windings give rise to stray fields. In order to have an optimum cancelling of stray field effects of adjacent primary windings, the connectivity of the two loops of the primary winding can be chosen such that an opposite and self cancelling orientation of stray fields in the four legged structure results.

The transformer can generally be at least partially, preferably totally immersed in oil.

Typically such a converter can be rated for powers above 20 kW, preferably in the range of 20-200 kW and/or for output DC-voltages above 50 kV, preferably in the range of 50-150 kV.

The present invention also relates to the use of such a converter as a power supply for an electrostatic precipitator, so it also relates to an electrostatic precipitator comprising a converter as described. Further embodiments of the present invention are outlined below.

DETAILED DESCRIPTION

The invention proposes a new structure of the transformer windings and core. It also includes the high voltage rectifier. The basic principle is that a number of high voltage modules are connected in series (e.g. 16 modules in the present design). Each module comprises an individual core, a high voltage winding, and insulation material. Each individual core is connected to a high voltage rectifier. The outputs of the rectifiers are connected in series. The sum of the outputs forms the total output voltage. The modules are placed so that a primary winding can be applied so that it passes through all modules. The main insulation (primary to secondary) e.g. comprises a tube of insulation material.

Possible is for example a two leg structure or a four leg structure, wherein each leg is formed by a stack of secondary windings around closed magnetic cores. The number of legs affects not only the physical dimensions, height vs. width, of the design but also the stray field of the magnetic circuit (leakage inductor), dipole-quadripole-characteristic, etc.

Figure 2:
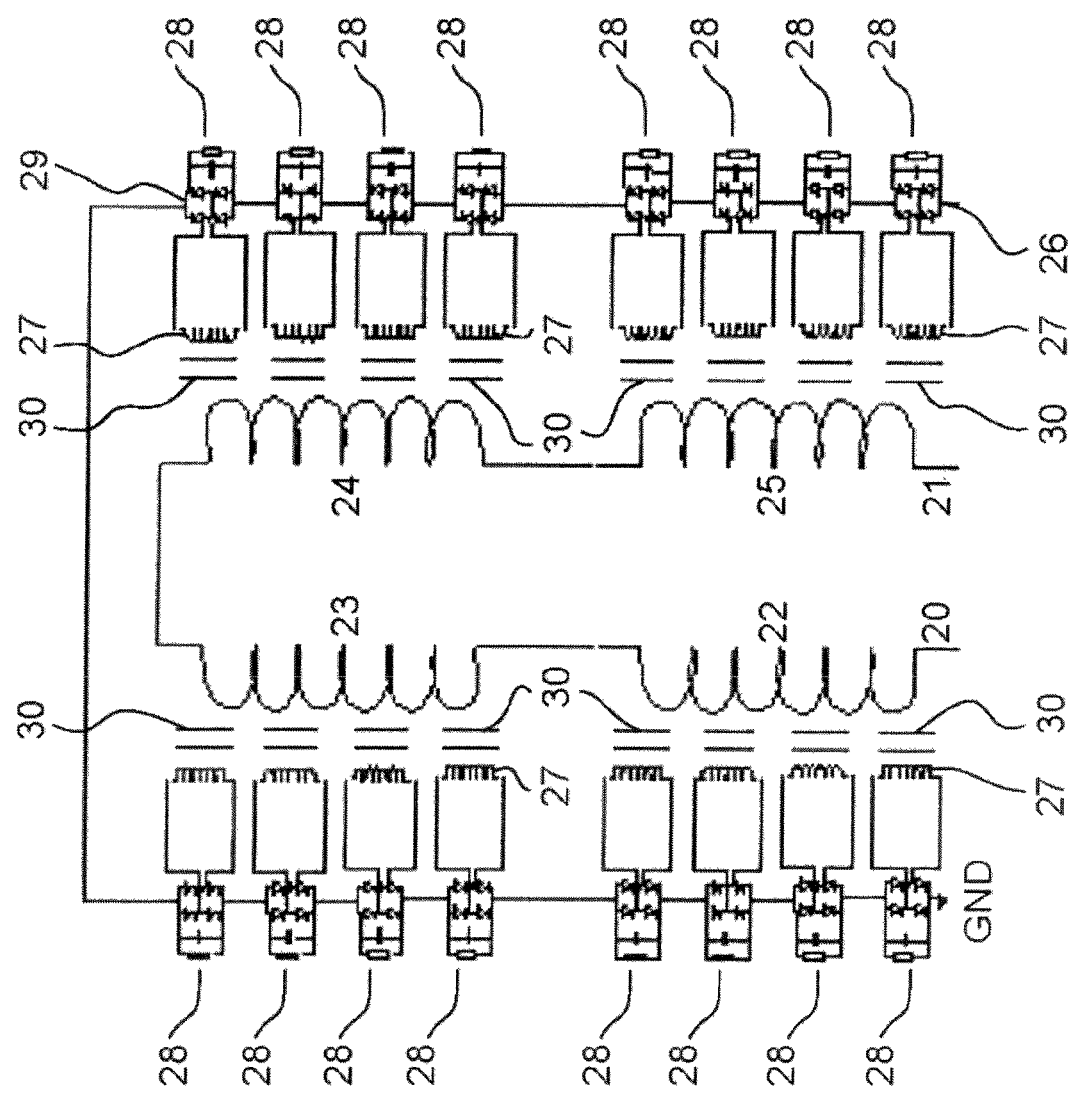
FIG. 2 shows a schematic circuitry of a transformer structure.

In the following the invention shall be described by exemplary embodiments, wherein this description shall be interpreted to show a possible realisation but shall not be used to limit the scope of the claims as attached. FIG. 2 shows a transformer structure in the context of a topology as given in FIG. 1, and the figure basically details the section designated with the reference no. 10 in FIG. 1. In accordance with the invention, the transformer is structured in a modular way, namely in that on the one hand the primary winding is split into individual primary windings, in the case there is provided four individual primary windings 22, 23, 24 and 25, which are connected to the resonant tank 9 by the conductors 20 and 21. The individual primary windings 22-25 are connected in series.

Also on the secondary winding side this structure is split into individual elements. So for each primary winding, there is a plurality of secondary windings, as indicated by the reference numeral 27. Specifically, in contrast to previous techniques, each of these secondary windings 27 is coupled to the corresponding primary winding by an individual magnetic core 30. So the cross-talk between the primary and the secondary winding is not effected by having one primary winding, one magnetic core and several secondary windings, but for each secondary winding an individual magnetic core is provided. Furthermore, each individual secondary winding 27 comprises its own high-voltage rectifier, where each of the high-voltage modules 28 for example comprises a diode bridge and possibly also corresponding additional elements as necessary for control and balance.

All the individual high voltage modules 28 are connected in series wherein the resulting voltages are added to the final total high-voltage, which for example can be used for the plates of an electrostatic precipitator.

Figure 3:
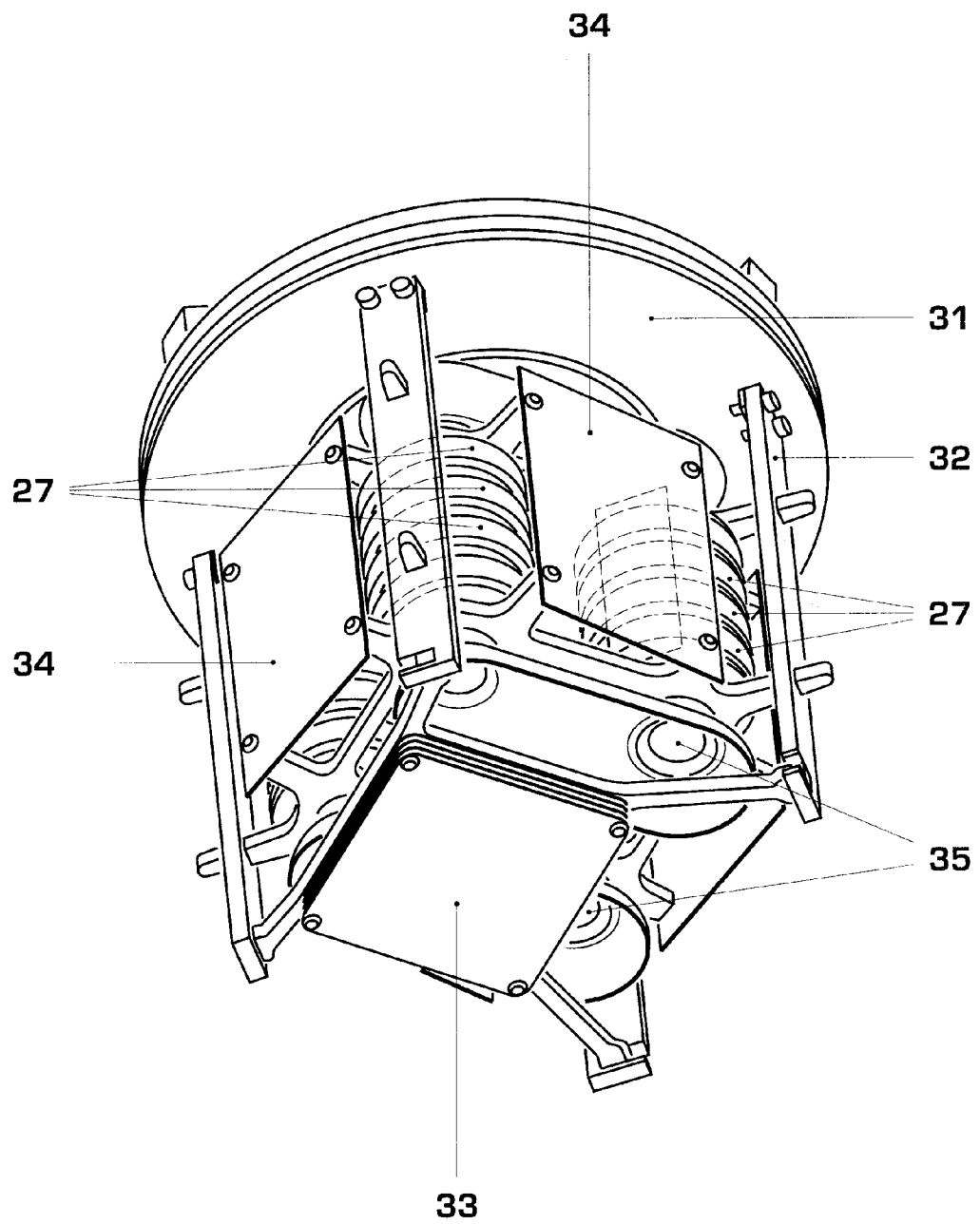
FIG. 3 shows a perspective view of a possible four-leg structure of the transformer.

FIG. 3 shows a perspective view of a possible realisation of such a transformer. One can see that there are four individual stacks, which are arrayed parallel to each other.

Each of these stacks is a coaxial stack of closed magnetic cores, around which the secondary windings 27 are wound. In the centre of the openings of the secondary windings which are wound around the magnetic cores, there is usually provided a tube of insulating material which on the one hand serves to insulate the secondary windings from the primary windings and which on the other hand serves as a supporting structure. The primary windings, which are for the sake of clarity not indicated in FIG. 3, pass through the openings of these tubes, the bottom end of which is indicated by the reference numeral 35. Those four stacks are held together by a carrier structure 32, which is itself attached to a cover plate 31. One can see in this figure that the cover plate has a circular structure, which is adapted to be covering a container with oil into which the whole transformer is immersed. On the four lateral sides the structure comprises carrier boards 34, on which the high-voltage rectifiers for the individual secondary windings 27 can be mounted. It furthermore comprises a base plate 33.

Figure 4:
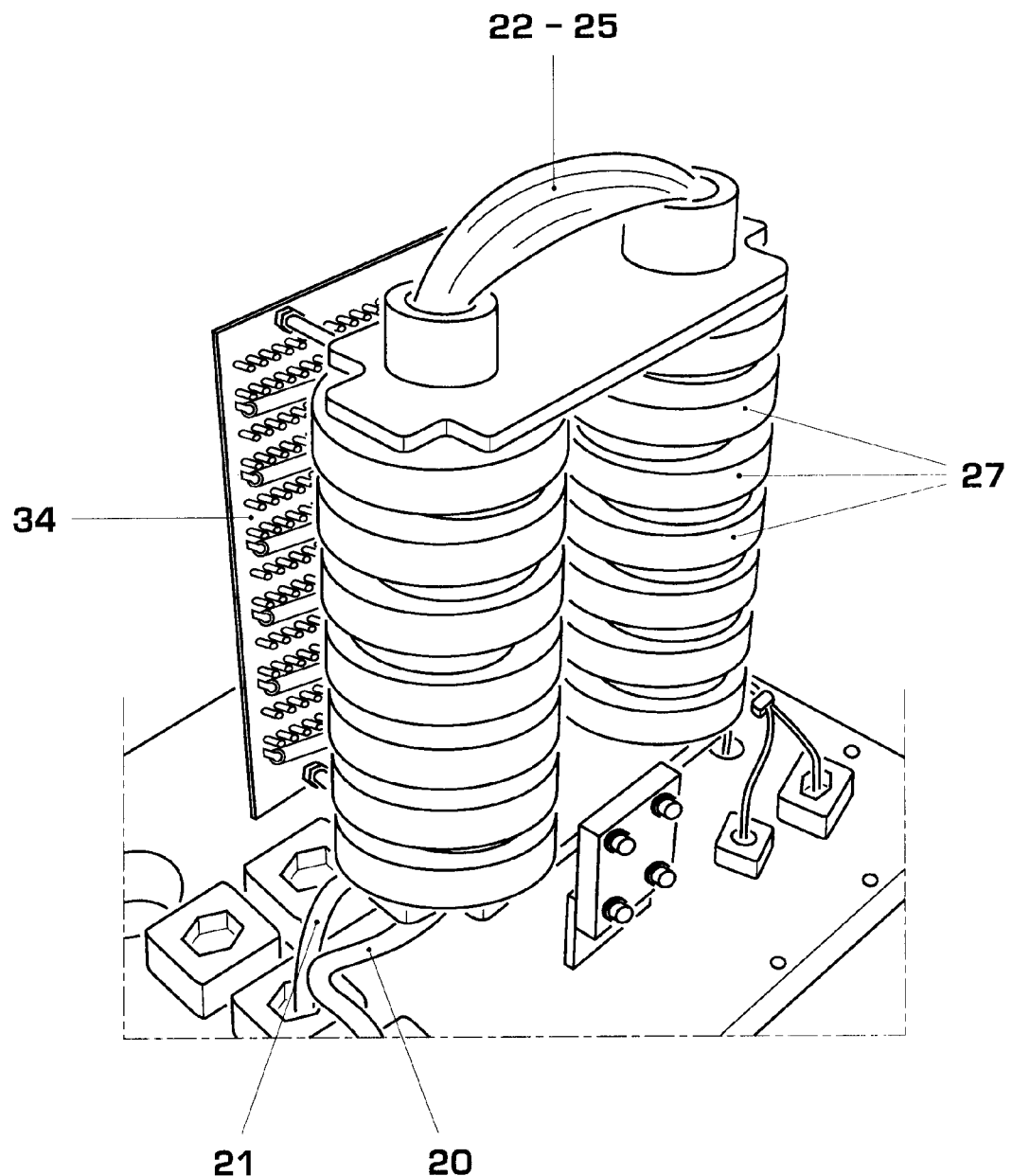
FIG. 4 shows an illustration of a two leg structure of the transformer.

Not only a four-leg structure as given in FIG. 3 is possible, but also a two-leg structure as given in FIG. 4. Here there is provided two stacks of seven secondary windings around closed magnetic cores, and through the central openings of these coaxially mounted secondary windings, there is provided the primary windings 22-25, which are connected to the resonant tank by the conductors 20 and 21. In this case, the high-voltage modules 28 are mounted on one single lateral carrier board 34.

Figure 5:
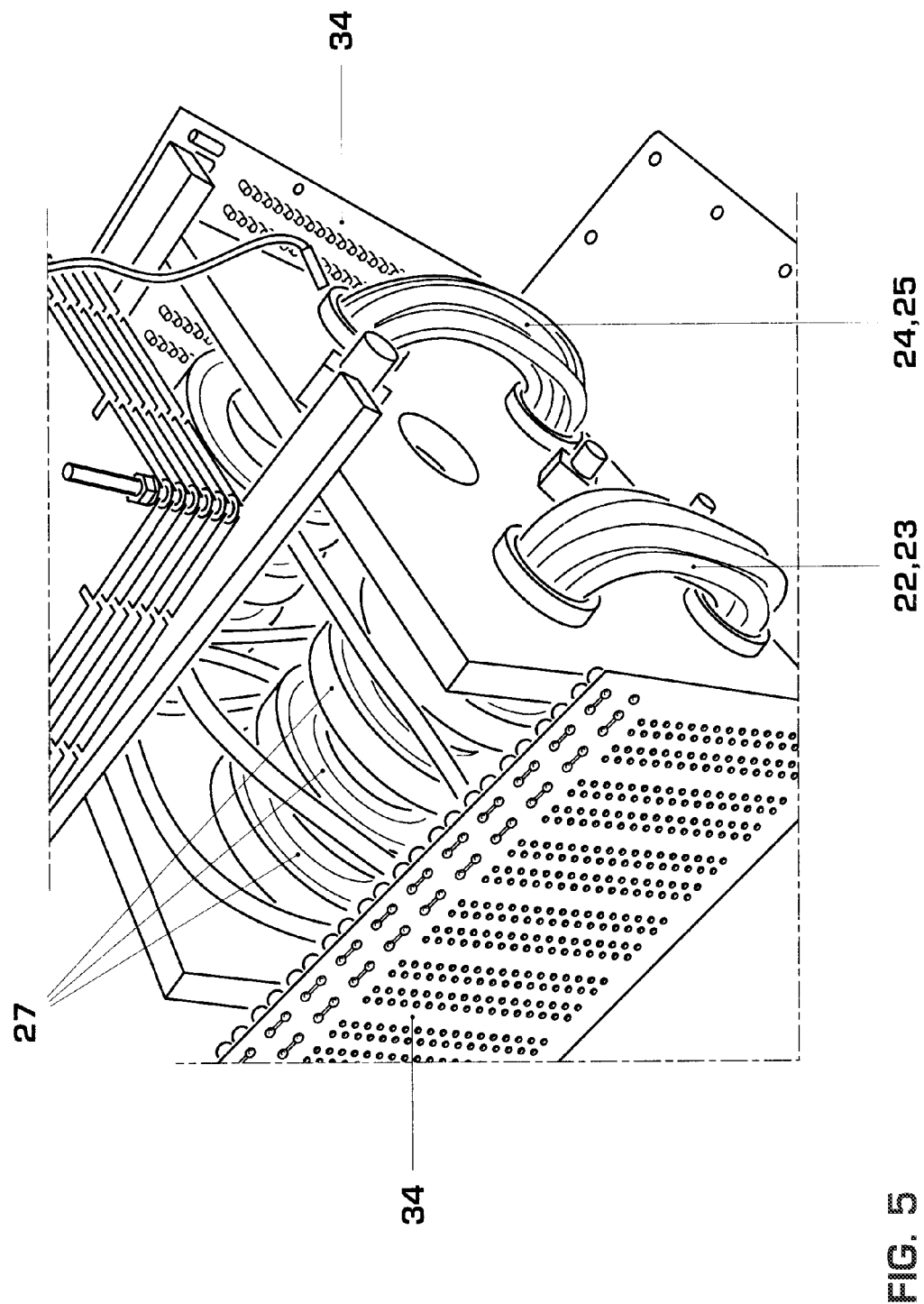
FIG. 5 shows an illustration of a four leg structure of the transformer.
Figure 6:
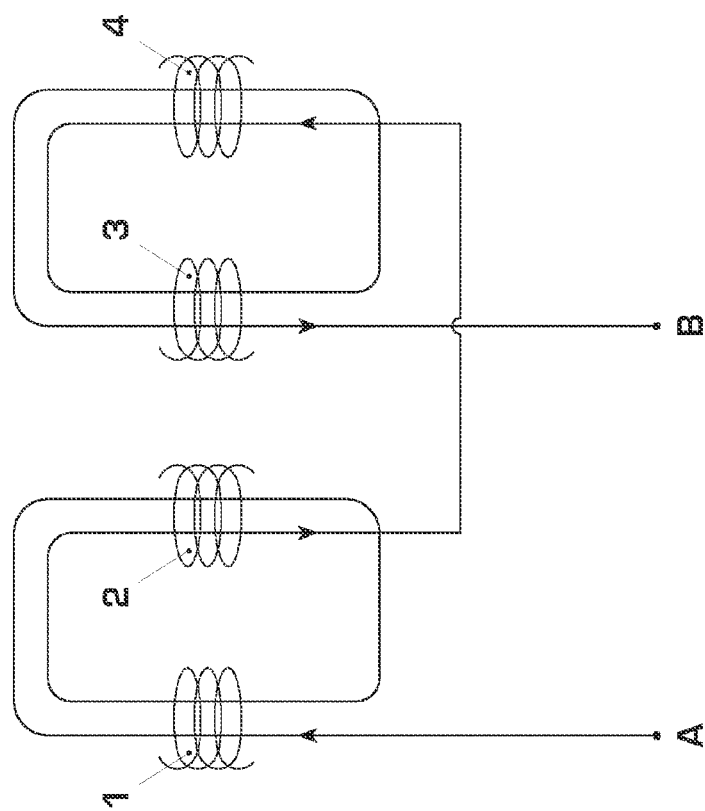
FIG. 6 shows a schematic of primary winding arrangement for a four legged structure of the transformer.
Figure 6:
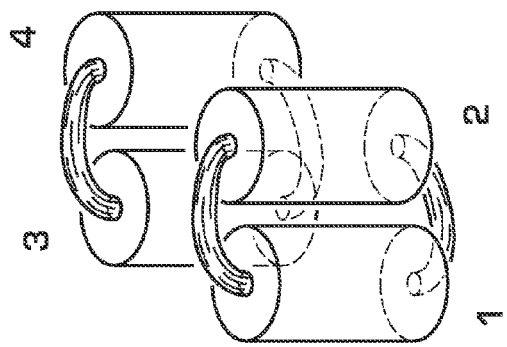
Figure 6:
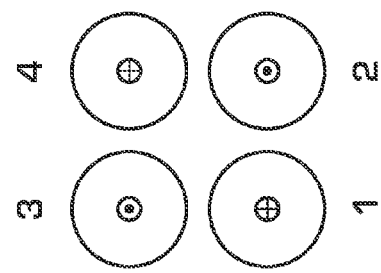

A more detailed view of a four-legged structure is given in FIG. 5. It shows the two closed structures of the primary windings 22, 23, 24 and 25. In view of the optimum cancelling of stray or leakage fields of these primary windings, the primary windings are connected such that the first group of primary windings 22, 23 is fed with an opposite current to the second group of primary windings 24, 25 such that the stray fields of these adjacent systems cancel each other. This is shown in FIG. 6. Furthermore, only two lateral boards 34 are provided for mounting the high-voltage modules.

FIG. 6 shows schematically the arrangement of the primary windings of a four-legged structure as shown in FIG. 5. FIG. 6 shows in simplified manner the four-legged structure with primary windings indicated by numerals 1, 2, 3, and 4, where the input A is at the top of winding 1 and the output B is at the end of winding 3. On the right, the corresponding schematic of the arrangement of the primary windings is shown, starting at input point A and ending at output point B. By this arrangement, each primary winding has two loops. Furthermore, a top view of a section through the primary windings indicates the direction of the current in the four legs.

By arranging the primary windings in such a way that their stray fields (leakage) have opposite directions, these fields will cancel out, thus reducing the total leakage flux of the transformer. Consequently, a more efficient design in terms of losses and volume can be obtained.

LIST OF REFERENCE NUMERALS 1-3 three phases of the AC-mains
4 switches
5 diodes
6 three-phase rectifier bridge
7 DC-link
8 transistor bridge, H-bridge
9 series resonance tank
10 transformer
11 high-voltage rectifier
12 load, precipitator
13 capacitor in 7
14, 15 transistors of 8
16 inductor of 9
17 capacitor of 9
18 single primary winding of 10
19 single secondary winding of 10
20,21 conductors (AC) between 8 and 9

22-25 primary windings, in series
26 conductor between 11 and 12
27 secondary windings of 28
28 high voltage modules
29 high-voltage rectifier of 28
30 individual cores of 27
31 cover plate
32 carrier structure
33 base plate
34 carrier boards for the high-voltage rectifiers
35 opening for the primary winding

What is claimed is:

1. High-voltage AC-DC converter for converting alternating current (1-3) into high-voltage direct current to be provided to a load (12), said converter comprising at least one transformer (10), having at least one primary winding (18, 22-25) on an AC-side and at least eight secondary windings (27) on a DC-side, the converter further comprising at least one rectifier (6) rectifying alternating input current, comprising at least one transistor bridge (8) for converting the resulting direct current into alternating current, said at least one transformer (10) transforming the resulting alternating current, and comprising at least eight high-voltage rectifiers (11, 29) with one of the high-voltage rectifiers (11, 29) connected to each of the secondary windings (27), wherein the output voltage of the high-voltage rectifiers (11, 29) is connected in series, and each of the secondary windings (27) has an individual magnetic core (30).

2. Converter according to claim 1, wherein three phase input alternating current (1-3) is rectified in the rectifier (6), wherein the resulting direct current is input to the at least one transistor bridge (8) via a DC link (7) with two conductors comprising a filter element (13), said filter element comprises at least one capacitor (13) between the two conductors, and the at least one transistor bridge (8) is a H-bridge with at least four switchable transistors (14, 14', 15, 15').

3. Converter according to claim 1, wherein between the at least one transistor bridge (8) and the at least one transformer (10) there is located a resonant tank (9), comprising at least one series resonator with at least one inductor (16) and at least one capacitor (17).

4. Converter according to claim 1, wherein the at least one transformer (10) comprises at least two magnetic cores (30), and each of the secondary windings (27) is associated with an individual magnetic core (30).

5. Converter according to claim 1, wherein each of the secondary windings (27) is connected to an individual one of the high-voltage rectifiers (11, 29), and all of the high-voltage rectifiers (11, 29) are connected in series to add to the total DC voltage.

6. Converter according to claim 1, wherein the at least one transformer (10) comprises at least 4 of the secondary windings (27), in combination with an equal number of individual magnetic cores (30).

7. Converter according to claim 1, wherein the at least one transformer (10) comprises at least 16 of the secondary windings (27), in combination with an equal number of the individual magnetic cores (30).

8. Converter according to claim 1, wherein the at least one transformer (10) comprises at least two of the primary windings (22-25).

9. Converter according to claim 1, wherein there is at least four of the secondary windings (27) which are provided around closed magnetic cores (30), having an opening where the at least one primary winding (18, 22-25) is located.

10. Converter according to claim 9, wherein the at least one primary winding (18, 22-25) is provided as a loop comprising at least two turns, and wherein two groups of at least two of the secondary windings (27) and associated closed magnetic cores (30) are arranged as coaxial stacks in two substantially parallel legs of the transformer.

11. High-voltage AC-DC converter for converting alternating current (1-3) into high-voltage direct current to be provided to a load (12), said converter comprising at least one transformer (10), having at least one primary winding (18, 22-25) on an AC-side and at least eight secondary windings (27) on a DC-side, the converter further comprising at least one rectifier (6) rectifying alternating input current, comprising at least one transistor bridge (8) for converting the resulting direct current into alternating current, said at least one transformer (10) transforming the resulting alternating current, and comprising at least eight high-voltage rectifiers (11, 29) with a separate one of the high-voltage rectifiers (11, 29) connected to each of the secondary windings (27), wherein the output voltage of the high-voltage rectifiers (11, 29) is connected in series, the secondary windings (27) are provided around closed magnetic cores (30), having an opening where the at least one primary winding (18, 22-25) is located, the at least one primary winding (18, 22-25) is provided as two loops each comprising at least two turns, the secondary windings (27) are arranged in four groups of each having at least two of the secondary windings (27) and the associated closed magnetic cores (30) are arranged in coaxial stacks of four substantially parallel oriented legs of the transformer.

12. High-voltage AC-DC converter for converting alternating current (1-3) into high-voltage direct current to be provided to a load (12), said converter comprising at least one transformer (10), having at least one primary winding (18, 22-25) on an AC-side and at least 16 secondary windings (27) on a DC-side, the converter further comprising at least one rectifier (6) rectifying alternating input current, comprising at least one transistor bridge (8) for converting the resulting direct current into alternating current, said at least one transformer (10) transforming the resulting alternating current, and comprising at least 16 high-voltage rectifiers (11, 29) with a separate one of the high-voltage rectifiers (11, 29) connected to each of the secondary windings (27), wherein the output voltage of the high-voltage rectifiers (11, 29) is connected in series, the secondary windings (27) are provided around closed magnetic cores (30), having an opening where the at least one primary winding (18, 22-25) is located, the at least one primary winding (18, 22-25) is provided as two loops each comprising at least two turns, the secondary windings (27) are arranged in four groups of each having at least four of the secondary windings (27) and the associated closed magnetic cores (30) are arranged in coaxial stacks of four substantially parallel oriented legs of the transformer.

13. Converter according to claim 11, wherein the two loops of the primary winding (18, 22-25) are connected such that an opposite and self cancelling orientation of stray fields in the four legged structure results.

14. Converter according to claim 12, wherein the two loops of the primary winding (18, 22-25) are connected such that an opposite and self cancelling orientation of stray fields in the four legged structure results.

15. Converter according to claim 1, wherein the transformer is at least partially, immersed in oil.

16. Converter according to claim 1, wherein it is rated for at least one of power in a range of 20-200 kW or for output DC-voltages in a range of 50-150 kV.

* * * * *